United States Patent Office 3,708,532
Patented Jan. 2, 1973

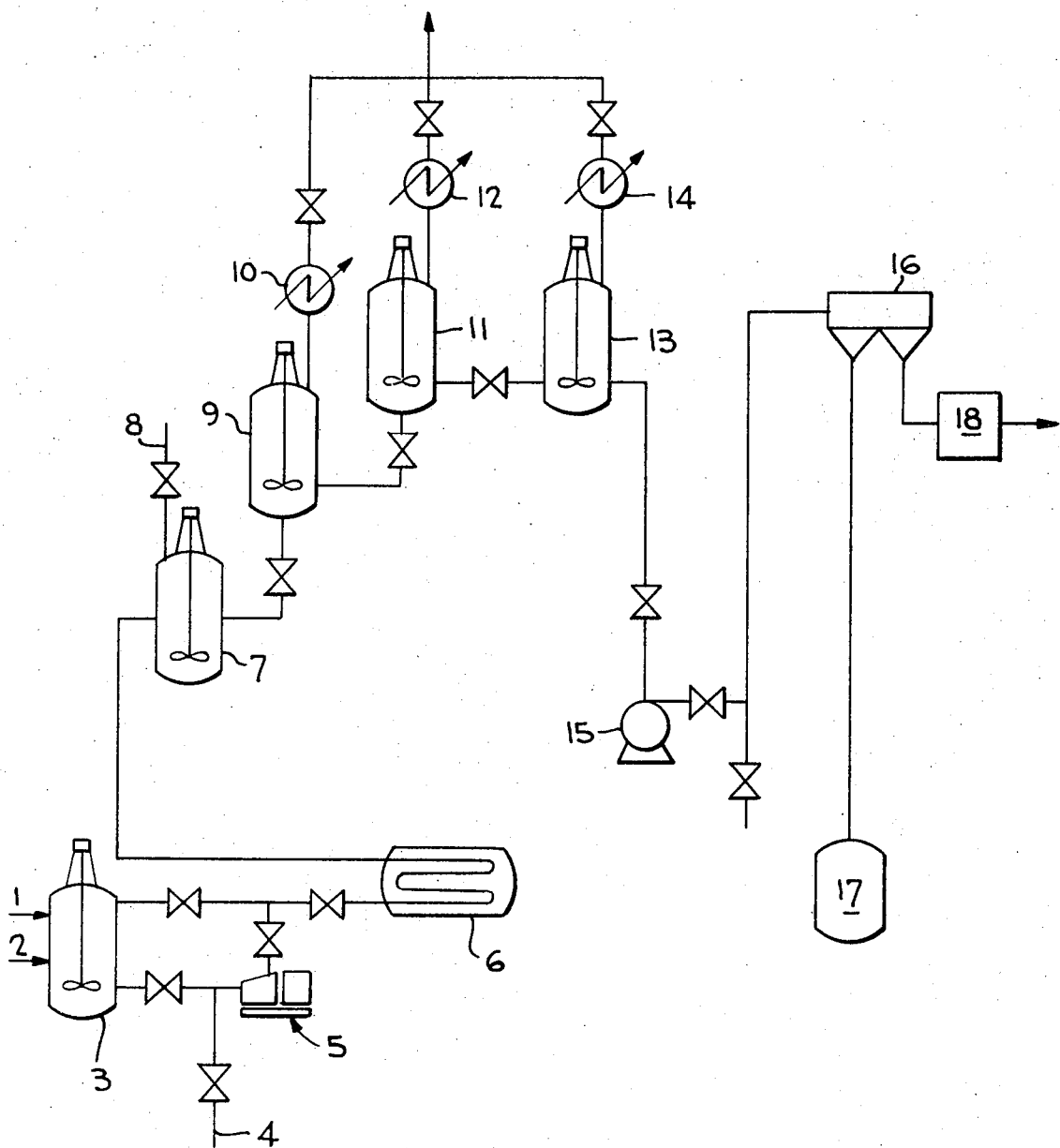

3,708,532
PROCESS FOR THE CONTINUOUS PURIFICATION OF CRUDE TEREPHTHALIC ACID
Yataro Ichikawa and Michiyuki Tokashiki, Iwakuni-shi, Japan, assignors to Teijin Limited, Osaka, Japan
Filed Nov. 4, 1968, Ser. No. 773,193
Int. Cl. C07c 51/42
U.S. Cl. 260—525                                    9 Claims

ABSTRACT OF THE DISCLOSURE

A process for the continuous purification of crude terephthalic acid by recrystallization comprising feeding a heated solution of crude terephthalic acid in a solvent comprising acetic acid, propionic acid or butyric acid, or an aqueous solution thereof into a first crystallization vessel maintained at a pressure below the vapor pressure of the heated solution, such pressure and temperature causing adiabatic evaporation of 10 to 60% by weight of the solvent in the solution whereby solid terephthalic acid is precipitated, and thereafter passing the slurry formed in the first crystallization vessel to a second and subsequent crystallization vessels maintained at a temperature and pressure lower than the preceding crystallization vessel so as to cause further precipitation of the terephthalic acid and adiabatic evaporation of 10 to 60% by weight of the slurry in the crystallization vessel, the terephthalic acid concentration in each of the first and subsequent crystallization vessels to be controlled to be no more than 60 parts by weight of terephthalic acid per 100 parts by weight of solvent. A terephthalic acid slurry is withdrawn from the last crystallization vessel and the terephthalic acid in a purified form is recovered therefrom.

---

This invention relates to a process for the continuous purification of crude terephthalic acid.

Conventionally, polyethylene terephthalate, or fiber- and film-forming linear, modified copolyester composed mainly of ethylene terephthalate units have been prepared by two-stage process, i.e., not by direct reaction of terephthalic acid with ethylene glycol, but terephthalic acid is first converted to, for example, dimethyl terephthalate, and thereafter subjected to an ester-interchange reaction with ethylene glycol. This is because, while purification of terephthalic acid is extremely difficult, dimethyl terephthalate can be refined by such means as recrystallization and distillation, with relative ease.

However, in accordance with the conventional method, the circuitous process of first esterifying terephthalic acid with methyl alcohol to produce dimethyl terephthalate, and further subjecting the same to an ester-interchange reaction with ethylene glycol, must be employed. Therefore, if polyethylene terephthalate or modified copolyester thereof can be prepared by direct esterification of terephthalic acid with ethylene glycol, the industrial advantage of such a process is obvious.

For the polyethylene terephthalate or modified copolyester thereof, which is obtained by such direct esterification reaction, to exhibit excellent water whiteness and high commercial value in the forms of fiber and film, the terephthalic acid used as the starting material must be well refined have high purity.

Industrial scale preparation of terephthalic acid has been heretofore practiced by such means as oxidation with nitric acid or air of p-dialkylbenzene, particularly p-xylene, Henkel process using phthalic anhydride as the starting material, etc.

Furthermore, recently another method for preparation of terephthalic acid has been proposed, in which p-dialkyl-benzene, particularly p-xylene, is oxidized by molecular oxygen in liquid medium, under relatively mild reaction conditions such as the temperature not higher than 150° C., in the presence of a cobaltic compound. As the liquid medium, for example, aliphatic monocarboxylic acids of 2-4 carbons, or aqueous solutions thereof are normally used. Also various improvements have been proposed concerning the above method, which include (a) the process performing the above reaction in the presence of methylenic ketone such as methyl ethyl ketone, as the reaction activator (U.S. Pats. Nos. 2,853,514 and 3,036,-122) (b) the process using ozone ($O_3$) as the reaction initiator, (c) the process adding aldehyde such as acetaldehyde as the reaction activator (U.S. Pat. No. 2,673,-217) (d) the process adding a large quantity of ether such as diisopropyl ether as the reaction activator, and (e) the process performing the reaction in the presence of a large quantity of cobalt salt.

The crude terephthalic acid prepared by those processes, however, occasionally contains colored impurities and impurities capable of forming coloring matters, and is inappropriate as the material for water-white linear polyester, for example, polyethylene terephthalate, when employed in the direct esterification method. Therefore, such crude terephthalic acid cannot be utilized in the direct esterification as it is, but must be first refined to the satisfactorily high purity.

Various methods for refining the crude terephthalic acid for the above purpose are known. For example, methods using oxidizing agent such as $KMnO_4$, $K_2Cr_2O_7$, $NHO_3$, and chlorine compounds; method using reducing agent; methods of purifying the crude terephthalic acid by sublimation, adsorption, or ion-exchange; method of washing crude terephthalic acid with various solvents; method of first dissolving the acid in an alkaline solution and thereafter precipitating the same with an acid; method of contacting the reaction liquid which contains crude terephthalic acid resulting from oxidation of p-xylene further with molecular oxygen at high temperatures and pressures; and partial esterification process, etc., are known. However, none of the above refining methods is completely free from all of the problems such as (A) insufficient purification, (B) loss of the materials and mixing of the chemicals into the terephthalic acid, (C) loss of the medium used, (D) operational difficulties and problems incidental to the equipment, etc. Thus none of the above methods can be regarded as very satisfactory.

Besides the above, there are also the refining methods by recrystallization of the crude terephthalic acid, from various solvents such as water; nitrogen-containing compounds such as nitriles, imides, amides, etc.; various ketones; hydrocarbons, alcohols, aromatic carboxylic acids such as benzoic acid, dialkylsulfoxides; cyclic ethers; lactones; sulfuric acids; aliphatic monocarboxylic acid; etc.

Among those solvents, however, some cause qualitative degradation of the product terephthalic acid because trace quantities thereof mix into the terephthalic acid crystals, and still others exhibit little solubility variation to terephthalic acid, in correspondence to temperature change. Thus, not all of the above solvents are practical, but fatty acids such as acetic, propionic, and butyric acids are free from such deficiencies, and are the best solvents for the refining purpose, when compared with the rest. Because, when the specific solvents are used, the impurity distribution is much heavier in the filtrate side, and the solvents decompose little and possess high solubilities of terephthalic acid at high temperatures, the solubilities furthermore varying appreciably in correspondence with the temperature change.

However, since the solubility of terephthalic acid in such fatty acids at room temperature is very low, when the monocarboxylic acid is used as the recrystallization solvent, first the crude terephthalic acid must be dissolved in the solvent at a high temperature and pressure.

The high temperature solution or slurry of the terephthalic acid in that type of solvent is extremely corrosive. Therefore, the recrystallization vessel must be constructed of special corrosion-resistant metal. Furthermore, because the solution or slurry must be treated at high temperature and pressure conditions, objectionably long periods and large scale refining equipment are required, if the conventionally practiced ordinary recrystallization method is followed.

Accordingly, the object of the present invention is to provide a process for recrystallization purification of crude terephthalic acid prepared by the aforementioned various methods, particularly that obtained by oxidation of p-dialkylbenzene with molecular oxygen, according to which mass processing is possible with small scale equipment and furthermore the purification is achieved to such a degree that the refined terephthalic acid becomes suitable as the material for direct esterification.

Another object of the invention is to provide a process for recrystallization purification of crude terephthalic acid by which the continuous refining is feasible, loss of chemicals employed is little and volume efficiency is high.

Still other objects and advantages of the invention will become apparent from the following description.

In accordance with the invention, the foregoing objects and advantages are accomplished by the process for continuous purification of crude terephthalic acid by recrystalization method using as the solvent at least one fatty acid selected from the group consisting of acetic, propionic and butyric acids or an aqueous solution of such fatty acid of a water content no more than 50%, characterized in that the purification is performed with the use of at least two crystallization vessels which are arranged in series, the process comprising feeding the solution, which is formed by dissolving 6–40 parts of crude terephthalic acid in 100 parts of the solvent, into the first crystallization vessel to cause adiabatic evaporation of 10–60% by weight of the solvent in the solution so that a part of the terephthalic acid in the solution is precipitated and the system is converted to a slurry; sending the slurry to the second and optionally subsequent crystallization vessels to cause precipitation of the terephthalic acid dissolved in the solvent in successively greater quantities, by the adiabatic evaporation in each single vessel of 10–60% by weight of the solvent in the slurry formed in the each preceding vessel, the solution and slurry being fed into the residual, priorly formed slurry in the first and subsequent crystallization vessels so that the adiabatic evaporation takes place in that system, and the solid terephthalic acid concentration in each crystallization vessel being controlled to be no higher than 60 parts by weight of terephthalic acid per 100 parts by weight of the solvent; withdrawing the terephthalic acid slurry from the last crystallization vessel; and recovering the terephthalic acid from the slurry.

Incidentally, "the quantity of adiabatically evaporated solvent" mentioned in the present specification refers to the absolute quantity of the evaporated solvent from the solution or slurry of terephthalic acid, upon introduction of the heated solution or slurry into a vessel in which the pressure is lower than the saturated vapor pressure of the solution or slurry, the evaporation being caused by the pressure difference. Therefore, the "quantity of adiabatically evaporated solvent" does not always correspond with the total quantity of the solvent evaporated from each of the crystallization vessels.

The invention will be explained in further detail hereinbelow.

The crude terephthalic acid to which the subject purification process is to be applied may be any of those prepared by the already mentioned known processes, while particularly that obtained by oxidation of p-dialkylbenzene, inter alia, p-xylene, with molecular oxygen in a liquid medium is preferred. Thus, the crude terephthalic acid to which the purification process of this invention is advantageously applied is that separated from the oxidation reaction mixtures resulting from the various modifications of the process as described in the beginning part of this specification, i.e., oxidation of p-dialkylbenzene, particularly p-xylene, with molecular-oxygen-containing gas such as air, in aliphatic monocarboxylic acid of 2–4 carbons or an aqueous solution thereof, in the presence of a cobalt-containing catalyst. Similarly the above crude terephthalic acid which is subsequently washed with the liquid medium, or subjected to other refining steps, can also be used.

According to the invention, the recrystallization solvent to be used for the refining of crude terephthalic acid is selected from acetic acid, propionic acid, butyric acid, mixtures thereof and aqueous solutions of those fatty acids with the water content no more than 50% by weight. Although the satisfactory refining effect of the invention can be achieved with the use of any of the foregoing acids alone, even better result can be obtained particularly when an aqueous solution of the foregoing acid or acids of the water content ranging from 3–15 wt. percent is used. When the water content of the solution exceeds 50%, high purity terephthalic acid cannot be obtained. However, in respect of solubility of terephthalic acid and economy, the preferred solvent is acetic acid or aqueous acetic acid having a water content of not more than 50 wt. percent, particularly not more than 25%, inter alia, aqueous acetic acid of water content ranging from 3–15 wt. percent.

In case of preparing such solvent solution of crude terephthalic acid in accordance with the invention, the feasible mixing ratio of the components is 6–40 parts by weight of the crude terephthalic acid, preferably 8–25 parts by weight, per 100 parts by weight of the solvent. The temperature of heating the mixture of crude terephthalic acid with recrystallization solvent is not critical, as long as it is sufficiently high to completely dissolve the acid in the solvent. Normally, when acetic acid or aqueous solution thereof is used as the solvent, the dissolving temperature ranges from 250°–330° C., preferably 260°–310° C. When the quantitative ratio of the crude terephthalic acid to the solvent is less than the above lower limit, the quantity of the solvent becomes greatly excessive to the crude terephthalic acid to be refined, and the processing quantity of the latter per unit volume of the purification equipment becomes less. Such is industrially disadvantageous. Whereas, if the ratio of the acid is higher than the upper limit of the above-specified range, considerably high temperature heating is required for dissolving the total quantity of the acid, and as the result corrosion of the apparatus is inevitable. Furthermore, if the dissolving temperature is further elevated, the operation is performed at around the critical point of the solvent. Consequently operational stability can be hardly maintained.

According to the invention, thus obtained heated solution of crude terephthalic acid is fed into the first crystallization vessel of at least two of such vessels arranged in series, and in that first vessel, 10–60 wt. percent of the solvent in the solution as introduced is adiabatically evaporated. Thus in the first crystallization vessel rapid temperature fall is caused by the latent heat of vaporization of the aforesaid quantity of solvent, and a part of the terephthalic acid is precipitated. Consequently the system is converted to a slurry. In that case, if the quantity of adiabatically evaporated solvent is less than 10 wt. percent, sufficient temperature reduction is not performed by the evaporation and a very large number of crystallization vessels are required to obtain the purified terephthalic acid at satisfactory recovery ratio, although the purity of the resultant terephthalic acid is quite satisfactory. Thus such is industrially objectionable, while high purity terephthalic acid cannot be obtained if the quantity of the adiabatically evaporated solvent in the first vessel exceeds 60 wt. percent.

For the above reasons, the suitable quantity of the adiabatically evaporated solvent in the heated solution of crude terephthalic acid at the first crystallization vessel ranges from 10–60 wt. percent, preferably 30–60 wt. percent in view of the purity of the precipitated terephthalic acid and number of the vessels required for recrystallization of terephthalic acid.

As aforesaid, upon introduction of the heated solution into the first crystallization vessel, 10–60 wt. percent of the solvent in the solution is adiabatically evaporated, whereby the heat corresponding to the latent heat of vaporization of the solvent is removed to outside the system. Thereupon the temperature of the solution abruptly drops to cause partial precipitation of the terephthalic acid, and the system is converted to a slurry of the terephthalic acid. In that procedure, the pressure inside the first crystallization vessel must be maintained at the level below the vapor pressure of the heated solution of crude terephthalic acid to be introduced thereinto, and also at the level as will maintain the quantity of adiabatically evaporated solvent in the solution within the range specified in the foregoing.

In practice, the introduction of the heated solution of the crude terephthalic acid into the first crystallization vessel is performed by direct introduction of the heated solution into the slurry formed of priorly introduced heated solution, with its terephthalic acid content partially percipitated. That is, in the first crystallization vessel, the heated solution of crude terephthalic acid is blow into the terephthalic acid slurry, and wherein the adiabatic evaporation takes place, quenching the heated solution. In the same vessel, therefore, the terephthalic acid particles precipitated upon the quenching of heated solution are mixed with the terephthalic acid slurry residual in the vessel, whereby complete precipitation of the terephthalic acid present in the solution at the concentration exceeding the solubility thereof in the solvent at the temperature inside the vessel, is secured.

It is theoretically possible to blow the heated solution of crude terephthalic acid into the vapor phase in the first crystallization vessel to cause the adiabatic evaporation. However, in such a case the heated solution is not quickly mixed with the terephthalic acid slurry residual in the vessel, causing the precipitation of extremely fine particle size terephthalic acid which not only is difficult to be separated from the mother liquid, but also exhibits insufficient purity. Furthermore, in case of blowing the heated solution into the vapor phase, the blowing-in entrance is adhered with the precipitated terephthalic acid, and stable blowing operation is rendered difficult. In extreme cases, the entrance is entirely clogged.

Therefore, in accordance with the invention, the introduction of the heated solution into the first crystallization vessel, and also the later-described introduction of the slurry formed in each of the preceding vessel, into the second and optionally subsequent crystallization vessels, are in all cases performed into the residual slurry present therein. Whereby high purity terephthalic acid can be obtained continuously, with the stable operation.

Thus the slurry containing the partially precipitated terephthalic acid in the first crystallization vessel is withdrawn and successively blown into the residual slurry in the second crystallization vessel, either continuously or intermittently. In the second vessel again the adiabatic evaporation of 10–60 wt. percent, preferably 30–60 wt. percent, of the solvent in the introduced slurry takes place, and the slurry is further cooled to cause precipitation of greater quantity of solid terephthalic acid than that in the first vessel. Consequently, a slurry of higher concentration is formed. Obviously, the pressure in the second crystallization vessel is similarly controlled to that in the first vessel, so that the quantity of adiabatically evaporated solvent in the slurry introduced into the vessel should become 10–60 wt. percent, preferably 30–60 wt. percent.

The refining in accordance with the invention is thus performed by introducing the heated solution of crude terephthalic acid into the first crystallization vessel in the described manner, thereby causing partial precipitation of terephthalic acid, and further introducing the resultant slurry into the second crystallization vessel to cause further precipitation of terephthalic acid. Such precipitation can be performed repeatedly in the similar manner, using more than two crystallization vessels. Preferably the recrystallizing operation in accordance with the invention is repeated until the temperature of the terephthalic acid slurry is lowered to room temperature —200° C., particularly the boiling point of the employed solvent at atmospheric pressure —150° C. However, for practical conveniences, it is normally preferred to use 2–25, particularly 3–8, crystallization vessels.

According to the invention, it is necessary to control the terephthalic acid concentration in each of the crystallization vessel to be not more than 60 parts, preferably not more than 50 parts, of solid terephthalic acid per 100 parts of the solvent, the parts being by weight. Because, if in any of the vessels the solid terephthalic acid concentration in the slurry exceeds the above limit, not only the terephthalic acid purity is impaired, but also the transferring and handling of the slurry become difficult.

The controlling of the solid terephthalic acid concentration is effected by supplying of suitable quantity of the solvent into the vessel in which the concentration became higher than the above limit because of escape of the adiabatically evaporated solvent to outside of the system. This supply can be suitably effected by introducing a part or total of the condensation liquid obtained by condensing the adiabatically evaporated solvent from the vessels, into the pertinent crystallization vessel at the desired rate. Obviously, however, the supply is not limited to the condensation liquid, but fresh solvent may be separately added to the slurry in the particular vessel. Whereas, it is a preferred practice in accordance with the invention, to control the solid terephthalic acid concentration in each of the crystallization vessels to be not more than 60 parts, preferably not more than 50 parts, of terephthalic acid per 100 parts of the solvent, the parts being by weight, by supplying the solvent of the quantity corresponding to at least 70 wt. percent, of the adiabatically evaporated solvent from the crystallization vessels.

The condensation liquid and/or the fresh solvent is not necessarily added directly into the vessel or vessels, but may be added to the conduit connecting the vessels.

The average residence time of the slurry in each crystallization vessel is not less than 2 minutes, preferably not less than 5 minutes. Although the upper limit is not critical, excessively long residence time is economically objectionable. Accordingly, it is desirable to perform the operation with the residence time of the slurry in each of the vessels, normally no longer than 5 hours, particularly not longer than 2 hours.

Thus the slurry withdrawn from the final crystallization vessel in accordance with the invention contains no more than 60 parts of solid terephthalic acid per 100 parts of the solvent, the parts being by weight. The slurry is separated into the solid terephthalic acid and the solvent, by any known solid-liquid separation means. For example, the solid terephthalic acid can be recovered by filtration, centrifugal separation, etc. Thus recovered terephthalic acid may be used as the starting material for polyester preparation without further processing, or may be imparted with still higher purity by repetitive practice of the continuous purification of the invention or by other known refining means.

In practicing the above-described process of this invention, the pre-heater, crystallization vessels and conduits connecting them, in which the heated solution or slurry formed of terephthalic acid and the solvent are handled, are either constructed of such materials as corrosion-resistant titanium, zirconium, tantalum, silver, etc., or inside surfaces thereof are lined with such corrosion-resistant materials. However, when the temperature employed is not higher than 150° C., stainless steel can also be used.

Hereinafter a preferred embodiment of the subject continuous purification method will be explained in further details as to the case of using aqueous acetic acid as the solvent, with reference to the attached figure in which the procedures of this invention are illustrated in the form of a flow sheet. In figure, three crystallization vessels are shown, but as aforesaid, the number of vessels is normally 2–25, preferably 3–8. For starting the subject process using the refining apparatus illustrated in figure, 10% hydrous acetic acid is fed from line 4, through the pre-heater 6 and dissolving tank 7, into the first, second, and third crystallization vessels 9, 11 and 13, each to the predetermined level, by means of a quantitative pump 5. Upon completion of the acetic acid suction, a heating medium is passed through the jackets on the pre-heater 6, dissolving tank 7 and the crystallization vessels 9, 11 and 13, to raise the temperature inside the equipment to the predetermined level. Thus the continuous operation is performed first with the acetic acid alone. Although 10% hydrous acetic acid is employed for the starting-up in this embodiment, since the acid is to be replaced by the later fed solution or slurry formed of terephthalic acid and solvent, when the subject process is applied continuously, the initially fed liquid medium need not be such specific acetic acid, but can be a slurry formed of that acetic acid and terephthalic acid, or water. Separately, from the line 1 crude terephthalic acid, and from line 2, 10% hydrous acetic acid, are fed into the slurry preparation tank 3, and the slurry concentration is adjusted, for example, to 15 wt. percent. The slurry preparation tank 3 is equipped with a stirrer, so that uniform suspension of the terephthalic acid in acetic acid may be effected. When the continuous operation with acetic acid is stabilized, the acetic acid supply from line 4 is stopped, and the slurry formed in the tank 3 is continuously supplied into the dissolving tank 7 with a quantitative pump 5, through the pre-heater 6. The heating with the pre-heater 6 and heating jacket on the dissolving tank 7 is performed to maintain the inside temperature of the dissolving tank 7, for example, at 295° C., and an inert gas such as nitrogen, carbon dioxide, argon, etc., is fed into the dissolving tank through line 8, so that the inside pressure of the tank 7 should become higher than 48 kg./cm.$^2$ G. which is the vapor pressure of the 10% hydrous acetic acid at 295° C., for example, 60 kg./cm.$^2$ G. The average residence time of the slurry in the dissolving tank 7 is, for example, approximately 10 minutes, and in the meantime the terephthalic acid is completely dissolved in the acetic acid. Thus obtained acetic acid solution of terephthalic acid is fed into the content of the first crystallization vessel 9, at such a rate as will make the liquid level in tank 7 substantially constant, either continuously or intermittently. The vessel 9 is equipped with a stirrer and a reflux condenser 10. The content of vessel 9 is maintained at 260° C., by the heating through the jacket and the function of said reflux condenser 10. Also the inside pressure is maintained at 28 kg./cm.$^2$ G. which is the vapor pressure of the content at 260° C. Consequently, immediately upon introduction of the heated solution from the tank 7 into the first crystallization vessel 9, an adiabatic evaporation of the solvent in the solution takes place in the residual liquid or slurry in the vessel 9, and approximately 53% of the solvent in the introduced solution is evaporated. Thus formed vapor is cooled and condensed in the reflux condenser 10, and the entirety thereof is refluxed into the first crystallization vessel 9. Obviously it is permissible to withdraw no more than 30% of the abiabatically evaporated quantity of the condensed acetic acid from the system, but refluxing of the the total quantity is preferred. The system cooled by the adiabatic evaporation is immediately homogeneously mixed with the residual content of the vessel, and under normal state, the portion of terephthalic acid content of the system exceeding the solubility thereof in the solvent at 260° C., precipitates as solid. Thus, in the vessel 9, 8.5 parts by weight of terephthalic acid is dissolved and 9.1 parts of crystalline terephthalic acid is suspended, per 100 parts of the acetic acid, the parts being by weight. The temperature control in the crystallization vessel is effected, when the solution or slurry is fed continuously, by adjusting the quantity of cooling water in the reflux condenser, or by controlling the effective heat transfer area by regulating the liquid level of the cooling medium. Such controlling means are easy and precise for the continuous operation, but are objectionable when the solution or slurry is fed intermittently, since such will cause objectionably great temperature variation in the vessel. In case of the batch-type practice, the temperature fall in the crystallization vessel can be prevented and the temperature can be maintained substantially constant, by closing the path of the condensed liquid from the reflux condenser to the crystallization vessel simultaneously with the termination of the solution or slurry supply into the vessel, so that the condensed liquid is stored in the reflux condenser and the cooling action of the condenser is suspended.

Then the slurry in the first crystallization vessel 9 is transferred into the residual content in the second crystallization vessel 11, at such a rate that the liquid level in the vessel 9 is maintained substantially constant, either continuously or at regular intervals. The construction of the second crystallization vessel 11 is identical with that of the first vessel 9. The temperature of the content of second vessel 11 is maintained at 200° C. by similar controlling means as applied to the first vessel, and the pressure is maintained at the vapor pressure of the residual content, for example 9.0 kg./cm.$^2$ G. Therefore, the portion of terephthalic acid content of the fed slurry exceeding the solubility thereof in the solvent at 200° C. precipitates in the crystalline form, and 45% of the acetic acid composing the slurry fed from the first crystallization vessel 9 is vaporized by adiabatic evaporation. The vapor is condensed in the reflux condenser 12, and the entirety thereof is refluxed into the second crystallization vessel 11. Thus in the vessel 11, 1.9 parts of terephthalic acid is dissolved and 15.7 parts of crystalline terephthalic acid is suspended per 100 parts of the acetic acid, the parts being by weight.

Then the slurry in the vessel 11 is transferred into the residual content of the third crystallization vessel 13 at such a rate that the liquid level in the vessel 11 is maintained substantially constant, either continuously or intermittently. The third crystallization vessel 13 is constructed of stainless steel, and equipped with a stirrer. Inside the vessel, the temperature is maintained at 108° C., and the pressure is atmospheric. Accordingly, the portion of terephthalic acid content of the fed slurry exceeding the solubility thereof in the solvent at 108° C. precipitates in crystalline form, and 45% of the acetic acid forming the slurry fed from the second crystallization vessel is vaporized by adiabatic evaporation. The vapor is condensed in reflux condenser 14, and the entire condensation liquid is refluxed into the third crystallization vessel 13. Thus, in the vessel 13, 0.10 part of terephthalic acid is dissolved, and 17.5 parts by weight of crystalline terephthalic acid is suspended per 100 parts of the acetic acid, the parts being by weight.

The slurry withdrawn from the vessel 13 is transfered to a separator 16 through a pump 15, and separated into the crystalline terephthalic acid and filtrate. The filtrate is sent to the filtration tank 17, and the crystals are dried in a dryer 18 to be recovered as the purified terephthalic acid.

According to the continuous purification process as abovedescribed, large quantities of crude terephthalic acid can be continuously refined with stable operation, using the relatively small scale refining apparatus. Furthermore, the purity of the resultant terephthalic acid is sufficiently high to allow its use as the starting material of the direct esterification process. Particularly the purification process of the invention is advantageous in that, whereby 4-carboxybenzaldehyde (4CBA) contained in crude terephthalic acid, which acts to objectionably color the polyester, is very effectively eliminated.

Hereinafter the invention will be explained with reference to working examples, in which the parts and percentages are by weight, unless otherwise specified. Also in the examples. "O.D." refers to the optical density measured of 25 cc. of the sample solution placed in a 5-cm. long cell, at 380 m$\mu$, the sample solution being formed by dissolving 1 g. of the sample in 14% aqueous ammonia.

EXAMPLE 1

Twenty (20) parts of p-xylene, 130 parts of glacial acetic acid, and 20 parts of cobalt acetate

were fed into a bubbling column type stainless steel pressure reactor provided with a gas inlet at the lower portion thereof, at such a rate as will make the average residence time 8 hours. While inside temperature of the reactor was maintained at 120° C., air was fed into the reactor at a superficial velocity in the column of 3 cm./sec., under a pressure of 10 kg./cm.$^2$ G. The reaction mixture was continuously withdrawn and separated into cake and liquid by means of centrifuge. The cake was mixed with three weight times thereof of acetic acid and treated for 20 minutes at 80° C. under atmospheric pressure, followed by hot solid-liquid separation. The resultant cake was again subjected to the identical treatment, and separated into the solid and liquid. The crude terephthalic acid obtained by washing the solid (O.D., 0480; 4CBA content, 1.5%) and glacial acetic acid were fed into the below-specified titanium pressure vessel. Into the system air was fed continuously at the supply rate of 1 Nl/(l slurry) (min.), and the system was stirred for an hour at the pressure of 24 kg./cm.$^2$ G. and temperature of 220° C. Thereafter the system was cooled to 115° C. at a cooling rate of 3° C./min., withdrawn from the vessel, and separated into solid and liquid. The resultant cake was washed with acetic acid and dried.

Fifteen (15) parts of thus obtained terephthalic acid (O.D., 0060; 4CBA content, 1,200 p.p.m.) was fed through line 1 in the figure, and 100 parts of 10% hydrous acetic acid (hereinafter this hydrous acetic acid will be referred to as "solvent" in this example) was fed through the line 2, both into the slurry preparation tank 3. The content of the tank 3 was agitated, so that the solid particles could be uniformly dispersed in the solvent. The slurry formed in the tank 3 was continuously sent to the dissolving tank 7, through a pre-heater 6, by means of a quantitative pump 5.

The pre-heater was a Trombone heat exchanger, in which the slurry was caused to flow through the titanium pipes and heated by the vapor-phase by heating of the heating medium from outside of the pipes. The dissolving tank 7 was an agitation tank constructed of titanium and provided with a heating packet, in which the heating was performed by vapor-phase heating similarly to that in the pre-heater 6, and the temperature was maintained at 290° C.

Argon gas was charged through line 8 in the dissolving tank 7 at an elevated pressure, so as to maintain the inside pressure within the range of 55–60 kg.cm.$^2$ G. Also the content was agitated so as to prevent the stagnation of the solid particles at the tank bottom. The solution obtained by dissolving the crude terephthalic acid in the solvent in tank 7 was transferred into the first crystallization vessel 9 constructed of titanium, at such a rate that the liquid level in tank 7 should be maintained substantially constant. The vessel 9 was equipped with a stirrer, heating jacket and reflux condenser 10. The temperature of the content in the vessel 9 was maintained substantially at 260° C., by adjusting the cooling ability of the reflux condenser 10 and the temperature of the heating medium in the jacket. In this example, all of the condensation liquid obtained by condensing the adiabatically evaporated solvent at each of the crystallization vessels was refluxed into the respective crystallization vessels.

In the vessel 9, 6.6 parts of terephthalic acid precipitated and 8.4 parts thereof remained dissolved, in 100 parts of the solvent. The average residence time of the slurry in the vessel 9 was 20 minutes, and the pressure inside the vessel was maintained at 28 kg./cm.$^2$ G., which was substantially identical with the vapor pressure of the solvent at the employed temperature. In the vessel 9, 45% of the solvent in the solution supplied from the dissolving tank 7 was adiabatically evaporated.

The slurry was transferred from the vessel 9 to the second crystallization vessel 11, at such a rate that the liquid level in the vessel 9 was maintained substantially constant. The vessel 11 was constructed of titanium, and its structure was identical with that of vessel 9. By the similar controlling means as employed as to vessel 9, the temperature inside the vessel 11 was maintained at 200° C. In the vessel 11 the terephthalic acid which was dissolved in the solvent was further precipitated, and consequently the crystalline terephthalic acid in 100 parts of the solvent increased to 13.1 parts, while 1.9 parts of terephthalic acid still remained as dissolved. The average residence time of the slurry in the vessel 11 was 20 minutes, and the pressure in the vessel was maintained at 8 kg./cm.$^2$ G., which was substantially identical with that of the vapor pressure of the solvent at the temperature employed. In the vessel 11, 45% of the solvent forming the slurry which was sent from the vessel 9 was adiabatically evaporated.

The slurry was subsequently sent from the vessel 11 to the third crystallization vessel 13, at such a rate that the liquid level in the vessel 11 was maintained substantially constant. The vessel 13 was made of stainless steel, and provided with a stirrer, cooling jacket and condenser 14. The inside of vessel 13 was cooled to 100° C. through the jacket.

In the third crystallization vessel 13, the terephthalic acid dissolved in the solvent further precipitated, and the crystalline terephthalic acid in 100 parts of the solvent increased to 14.9 parts, while only 0.1 part of terephthalic acid remained as dissolved in the slurry. The average residence time of the slurry in the vessel 13 was 30 minutes, and the pressure inside the vessel was atmospheric. In the vessel 13, 45% of the solvent forming the slurry supplied from the vessel 11 adiabatically evaporated, but since the slurry temperature in the vessel was lower than the boiling point of the solvent, the evaporated solvent was immediately condensed.

The slurry in the vessel 13 was transferred into the solid-liquid separator 16 through a pump 15, while retaining its high temperature. Wherefrom the filtrate was sent to the filtrate tank 17, and the cake was dried in the dryer 18 to be recovered as the purified terephthalic acid. The product had an O.D. of 0.030, and a 4CBA content of 260 p.p.m.

Thus purified terephthalic acid, 1.8 molar times thereof of ethylene glycol, and 0.06 mol percent to the terephthalic acid of Mn(OAc)$_2$·4H$_2$O were mixed, and charged into a stainless steel autoclave equipped with a rectification column and stirrer. After thorough nitrogen substitution of the inside atmosphere of the autoclave, nitrogen was further fed into the autoclave to provide a pressure of 5 kg./cm.$^2$ G. Whereupon the reaction of the terephthalic acid with ethylene glycol was started under stirring and heating. Simultaneously therewith, the inside pressure of the autoclave was reduced to 2.35 kg./cm.$^2$ G., and the temperature was elevated to 240° C. The reaction was performed for 2 hours from the initiation of heating. The quantity of the distillate consisting mainly of water, which was removed from the top of the rectification column during the reaction was 11 parts per 100 parts of the charged terephthalic acid. Upon completion of the reaction, the heating was stopped, and the autoclave was cooled and opened to the outside atmosphere. Subsequently the content was withdrawn.

Thus obtained esterification product was charged in a polymerization flask, and added with 0.1 mol percent of trimethyl phosphate and 0.030 mol percent of antimony trioxide, both based on the terephthalic acid subjected to the esterification reaction. The atmosphere in the flask was thoroughly substituted with nitrogen, and thereafter the flask was immersed in a salt bath of 285° C. The polymerization was continued for 30 minutes at atmospheric pressure. Thereafter, the pressure in the flask was gradually made reduced over a period of 30 minutes, by means of an aspirator. Then the pressure in the flask was further reduced by means of a vacuum pump, to not higher than 1 mm. Hg. Further the reaction was continued in that vacuum for 60 minutes, which was subsequently terminated by introduction of nitrogen gas into

EXAMPLE 2

11.1 parts of the crude terephthalic acid prepared similarly to Example 1 and 100 parts by weight of 10% hydrous acetic acid as the solvent were formed into a slurry in the slurry preparation tank 3, and the slurry was treated in the refining apparatus employed in Example 1 in the the flask. The resultant polymer exhibited excellent quality as demonstrated by the following property data:

$[\eta]$:0.658
S.P.:258.6° C.
Color tone: L=79.0 a=−0.7 b=−4.2
End carboxyl radicals:16.6 eq./$10^6$ g.

In the above, $[\eta]$ in the intrinsic viscosity of the polyester measured in ortho-chlorophenol solvent at 35° C.; S.P. stands for softening point of the polyester, and the color tone are expressed by L, a, and b which are the readings on a color-difference meter, in accordance with the indication method specified in ASTM. 1482-57T. identical manner. The purified terephthalic acid had an O.D. of 0.028, and a 4CBA content of 280 p.p.m.

EXAMPLE 3

6.1 parts of the starting terephthalic acid prepared in the identical manner with Example 1 and 100 parts of 10% hydrous acetic acid as the solvent were formed into a homogeneous slurry in the slurry preparation tank 3, referring to figure. The temperature in the dissolving tank 7 and the first crystallization vessel 9 was controlled to be substantially the same (260° C.), and the precipitation of terephthalic acid was performed in the second crystallization vessel 11 (200° C., 8 kg./cm.² G.) and third crystallization vessel 13 (108° C., atmospheric pressure). From each of the vessels 11 and 13, a part of the adiabatically evaporated solvent was withdrawn from the system. In the foregonig procedures, the adiabatic evaporation ratios of the solvent forming the solution or slurry, reflux ratios of the evaporated solvent, weight ratios of the solid terephthalic acid to the solvent, weight ratios of the terephthalic acid remaining dissolved in the solvent, to the solvent, and residence times of the solution or slurry, in the second and third crystallization vessels were as follows:

| | Adiabatic evaporation ratio (percent) | Reflux ratio (percent) | Solid TA/solvent | Dissolved TA/solvent | Residence time (min.) |
|---|---|---|---|---|---|
| Second crystallization vessel | 45 | 82 | 4.8/100 | 1.9/100 | 22 |
| Third crystallization vessel | 45 | 82 | 7.1/100 | 0.1/100 | 24 |

The terephthalic acid purified in the identical manner with Example 1 under the foregoing conditions had an O.D. of 0.028, and a 4CBA content of 260 p.p.m.

EXAMPLE 4

A refining apparatus as illustrated in figure in which an additional titanium crystallization vessel of the structure identical with that of the vessels 9 and 11 and which was equipped with a reflux condenser was combined, was employed. Twelve parts of the crude terephthalic acid prepared similarly to Example 1 and 100 parts of glacial acetic acid as the solvent were formed into a homogeneous slurry in the slurry preparation tank 3, and heated to 295° C. in the dissolving vessel. Thus obtained acetic acid solution of terephthalic acid was treated similarly to Example 1, under the below-indicated conditions.

| Crystallization vessel | Temperature (° C.) | Pressure (kg./cm.² G.) | Adiabatic evaporation ratio (percent) | Reflux ratio (percent) | Solid TA/solvent | Dissolved TA/solvent | Residence time (min.) |
|---|---|---|---|---|---|---|---|
| First | 277 | 28 | 58 | 100 | 3.0/100 | 9.0/100 | 20 |
| Second | 248 | 17 | 59 | 100 | 7.5/100 | 4.5/100 | 20 |
| Third | 188 | 4.6 | 57 | 100 | 10.9/100 | 1.1/100 | 20 |
| Fourth | 118 | 0 | 53 | 100 | 11.9/100 | 0.14/100 | 30 |

Thus purified terephthalic acid had an O.D. of 0.029 and 4CBA content of 260 p.p.m.

EXAMPLE 5

Thirty (30) parts of the crude terephthalic acid prepared similarly to Example 1 and 100 parts of 20% hydrous acetic acid as the solvent were formed into a homogeneous slurry in the slurry preparation tank, and the terephthalic acid therein was completely dissolved in the solvent at 305° C. in the dissolving tank. The resultant solution was treated in the same apparatus as employed in Example 1, under the following conditions.

| Crystallization vessel | Temperature (° C.) | Pressure (kg./cm.² G.) | Adiabatic evaporation ratio (percent) | Reflux ratio (percent) | Solid TA/solvent | Dissolved TA/solvent | Residence time (min.) |
|---|---|---|---|---|---|---|---|
| First | 260 | 32 | 52 | 100 | 19/100 | 11/100 | 20 |
| Second | 200 | 9.3 | 36 | 100 | 27.5/100 | 2.5/100 | 20 |
| Third | 105 | 0 | 36 | 72 | 33.4/100 | 0.07/100 | 35 |

Thus purified terephthalic acid had an O.D. of 0.032 and a 4CBA content of 390 p.p.m.

EXAMPLE 6

Eighteen (18) parts of the crude terephthalic acid prepared similarly to Example 1 and 100 parts by weight of 10% hydrous acetic acid as the solvent were formed into a homogeneous slurry in the slurry preparation tank, and the terephthalic acid was completely dissolved in the solvent at 295° C. in the dissolving tank. The resulting solution was treated in the same apparatus as employed in Example 4, under the following conditions.

| Crystallization vessel | Temperature (° C.) | Pressure (kg./cm.² G.) | Adiabatic evaporation ratio (percent) | Reflux ratio (percent) | Solid TA/solvent | Dissolved TA/solvent | Residence time (min.) |
|---|---|---|---|---|---|---|---|
| First | 268 | 32 | 43 | 100 | 7.8/100 | 10.2/100 | 20 |
| Second | 228 | 14.6 | 38 | 100 | 14.2/100 | 3.8/100 | 20 |
| Third | 176 | 4.2 | 33 | 100 | 17.0/100 | 1.0/100 | 20 |
| Fourth | 108 | 0 | 30 | 100 | 17.9/100 | 0.1/100 | 30 |

Thus purified terephthalic acid had an O.D. of 0.022, and a 4CBA content of 220 p.p.m. This terephthalic acid was esterified and polymerized under the identical conditions with those in Example 1, and high quality polyester was obtained as substantiated by the following properties.

[$\eta$]: 0.661
S.P.: 258.5° C.
Color tone: L=80.1 a=0.7 b=43
End carboxyl radicals: 15.7 eq./$10^6$ g.

EXAMPLE 7

Thirteen (13) parts of the crude terephthalic acid prepared similarly to Example 1 and 100 parts of 5% hydrous acetic acid as the solvent were formed into a homogeneous slurry in the slurry preparation tank, and the terephthalic acid therein was completely dissolved in the solvent at 295° C. in the dissolving tank. The resultant solution was treated in the same apparatus as employed in Example 4, under the following conditions.

| Crystallization vessel | Temperature (° C.) | Pressure (kg./cm.² G.) | Adiabatic evaporation ratio (percent) | Reflux ratio (percent) | Solid TA/solvent | Dissolved TA/solvent | Residence time (min.) |
|---|---|---|---|---|---|---|---|
| First | 263 | 25 | 50 | 100 | 5.4/100 | 7.6/100 | 10 |
| Second | 219 | 11 | 50 | 100 | 10.3/100 | 2.7/100 | 10 |
| Third | 165 | 2.6 | 40 | 100 | 12.3/100 | 0.7/100 | 10 |
| Fourth | 112 | 0 | 29 | 100 | 12.9/100 | 0.1/100 | 15 |

Thus purified terephthalic acid had an O.D. of 0.024, and a 4CBA content of 240 p.p.m.

EXAMPLE 8

Eighteen (18) parts of the crude terephthalic acid prepared similarly to Example 1 and 100 parts of 15% hydrous acetic acid as the solvent were formed into a homogeneous slurry in the slurry preparation tank, and the terephthalic acid was completely dissolved in the solvent at 290° C. in the dissolving tank. The resultant solution was treated in the same apparatus as employed in Example 1, under the following conditions.

| Crystallization vessel | Temperature (° C.) | Pressure (kg./cm.² G.) | Adiabatic evaporation ratio (percent) | Reflux ratio (percent) | Solid TA/solvent | Dissolved TA/solvent | Residence time (min.) |
|---|---|---|---|---|---|---|---|
| First | 253 | 26 | 40 | 100 | 9.8/100 | 8.2/100 | 40 |
| Second | 192 | 6.4 | 37 | 100 | 16.2/100 | 1.8/100 | 40 |
| Third | 105 | 0 | 34 | 100 | 17.9/100 | 0.1/100 | 60 |

Thus purified terephthalic acid had an O.D. of 0.030 and a 4CBA content of 260 p.p.m.

EXAMPLE 9

Eighteen (18) parts of the crude terephthalic acid prepared similarly to Example 1 and 100 parts by weight of 10% hydrous acetic acid as the solvent were formed into a homogeneous slurry in the slurry preparation tank, and the terephthalic acid was completely dissolved in the solvent at 295° C. in the dissolving tank. The resultant solution was treated in the same apparatus as employed in Example 4, under the following conditions as to the first through third crystallization vessels, and at the boiling point of the solvent under 100% reflux in the fourth crystallization vessel.

| Crystallization vessel | Temperature (° C.) | Pressure (kg./cm.² G.) | Adiabatic evaporation ratio (percent) | Reflux ratio (percent) | Solid TA/solvent | Dissolved TA/solvent | Residence time (min.) |
|---|---|---|---|---|---|---|---|
| First | 283 | 41 | 23 | 100 | 3.4/700 | 14.6/700 | 20 |
| Second | 266 | 31 | 22 | 100 | 8.2/100 | 9.8/100 | 20 |
| Third | 243 | 20 | 22 | 100 | 12.4/100 | 5.6/100 | 20 |

The slurry in the fourth crystallization vessel was withdrawn from the system without solid-liquid separation. The purifying operation was continued for 24 hours under the above-specified conditions, and thereafter the system was substituted with the solvent. Then the slurry obtained in the process was charged into the slurry preparation tank as it was, and wherefrom sent to the dissolving tank. In the same tank the solid terephthalic acid precipitated in the fourth crystallization vessel in the slurry was dissolved, to reproduce the conditions in the third crystallization vessel in the foregoing series of procedures, and the resultant slurry was treated under the below-indicated conditions.

| Crystallization vessel | Temperature (° C.) | Pressure (kg./cm.² G.) | Adiabatic evaporation ratio (percent) | Reflux ratio (percent) | Solid TA/solvent | Dissolved TA/solvent | Residence time (min.) |
|---|---|---|---|---|---|---|---|
| First | 217 | 12.8 | 23 | 100 | 15.2/100 | 2.8/100 | 20 |
| Second | 184 | 5.3 | 20 | 100 | 16.7/100 | 1.3/100 | 20 |
| Third | 149 | 1.8 | 17 | 100 | 17.6/100 | 0.4/100 | 20 |
| Fourth | 108 | 0 | 16 | 100 | 17.9/100 | 0.1/100 | 30 |

By the foregoing procedures, the identical result with that obtained by the continuous operation using seven crystallization vessels was obtained. The purified terephthalic acid had an O.D. of 0.020, and a 4CBA content of 200 p.p.m.

Control 1

Two-hundred (200) g. of the crude terephthalic acid as prepared in Example 1 was charged into a 4-liter capacity titanium pressure vessel equipped with a stirrer, together with 1,800 g. of 10% hydrous acetic acid. Thereafter argon gas was fed into the pressure vessel to a pressure of 10 kg./cm.$^2$ G., and the temperature inside the vessel was raised to 280° C. under stirring. The system was maintained at 280° C. for 5 minutes, and thereafter cooled to 100° C. at a rate of 2° C./min. The pressure was then reduced to the atmospheric, and the slurry was withdrawn from the pressure vessel, followed by hot filtration. Thus obtained cake was dried, and 195 g. of refined terephthalic acid was obtained, which had an O.D. of 0.025 and a 4CBA content of 240 p.p.m.

Control 2

Example 1 was repeated except the following changes:

| Crystallization vessel | Temperature (° C.) | Pressure (kg./cm.$^2$ G.) |
|---|---|---|
| First | 220 | 12.5 (vapor pressure of the solvent at 220° C.) |
| Second | 160 | Substantially the vapor pressure of the solvent at 160° C. |

In this control, the adiabatic evaporation ratio of the solvent in the first crystallization vessel was 0.65 to the solvent in the solution supplied, that in the second crystallization vessel was 0.5, and that in the third crystallization vessel was 0.1. Thus purified terephthalic acid had an O.D. of 0.40, and a 4CBA content of 700 p.p.m. The mode size was 30μ, with wide range of size distribution. That is, the terephthalic acid contained a large quantity of fine particles of less than 1μ in diameter.

Control 3

6.1 parts of the crude terephthalic acid prepared similarly to Example 1 and 100 parts of 10% hydrous acetic acid as the solvent were formed into a homogeneous slurry in the slurry preparation tank. The dissolving tank, first and second crystallization vessels were maintained at substantially the same temperature (260° C.) so that the precipitation of the terephthalic acid took place in the third crystallization vessel (108° C., atmospheric pressure, 100% adiabatic evaporation ratio, and 100% reflux ratio.) Other conditions were identical with those employed in Example 1. The resultant terephthalic acid had an O.D. of 0.060, and a 4CBA content of 1,000 p.p.m.

This terephthalic acid was esterified and polymerized under the same conditions as employed in Example 1, to produce the polymer of following properties.

[η]: 0.659
S.P.: 258.6° C.
Color tone: L=82.2 α=−0.8 b=−1.3
End carboxyl radicals: 15.7 eq./10$^6$ g.

This polymer was somewhat yellowed, compared with those produced in Examples 1 and 6, and could not be regarded to have a satisfactory color tone.

Control 4

Thirteen (13) parts of the crude terephthalic acid prepared similarly to Example 1 and 100 parts of glacial slurry in the slurry preparation tank, and the terephthalic acetic acid as the solvent were formed into a homogeneous acid was completely dissolved in the solvent in the dissolving tank at 295° C. The resultant solution was treated in the same apparatus as employed in Example 4, under the conditions given in the table below.

| Crystallization vessel | Temperature (° C.) | Pressure (kg./cm.$^2$ G.) | Adiabatic evaporation ratio (percent) | Reflux ratio (percent) | Solid TA/solvent | Dissolved TA/solvent | Residence time (min.) |
|---|---|---|---|---|---|---|---|
| First | 272 | 28 | 68 | 50 | 14.7/100 | 8.0/100 | 15 |
| Second | 236 | 14.6 | 63 | 50 | 29/100 | 3.4/100 | 24 |
| Third | 190 | 6.2 | 50 | 50 | 42/100 | 1.1/100 | 30 |
| Fourth | 118 | 0 | 54 | 40 | 63.5/100 | 0.1/100 | 58 |

Thus purified terephthalic acid had an O.D. of 0.045 and a 4CBA content of 880 p.p.m. This terephthalic acid was esterified and polymerized under the same conditions as employed in Example 1, to produce a polymer of the following properties.

[η]: 0.661
S.P.: 258.7° C.
Color tone: L=82.3 a=−0.7 b=−1.5
End carboxyl radicals: 15.3 eq./10$^6$ g.

This polymer was somewhat yellowish compared with the polymers of Examples 1 and 6, and thus its color tone was hardly satisfactory.

Control 5

Twenty-three (23) parts of the crude terephthalic acid prepared similarly to Example 1 and 100 parts of 55% hydrous acetic acid as the solvent were formed into a homogeneous slurry in the slurry preparation tank, and the terephthalic acid was completely dissolved in the solvent at 290° C. in the dissolving tank. The resultant solution was treated in the same apparatus as employed in Example 1. The temperatures in the crystallization vessels were substantially same to those employed in Example 1, and the pressures were substantially the same to the respective vapor pressure of the solvent in each of the vessels. The reflux ratio was in all cases 100%. The manner of operation was also the same to Example 1. The resultant terephthalic acid had an O.D. of 0.050 and a 4CBA content of 720 p.p.m.

We claim:
1. A process for the continuous purification of crude terephthalic acid by recrystallization which comprises (1) feeding a heated solution of crude terephthalic acid at a temperature of 250° to 330° C. formed by dissolving by heating 6–40 parts of crude terephthalic acid per 100 parts of a solvent consisting essentially of at least one fatty acid selected from the group consisting of acetic, propionic and butyric acids or an aqueous solution of such fatty acid having a water content of not more than 50%, into a first crystallization vessel maintained at a pressure below the vapor pressure of the heated solution introduced into said first crystallization vessel, the pressure and temperature in said first crystallization vessel causing adiabatic evaporation of 10–60% by weight of said solvent in said solution so that a portion of the terephthalic acid in said solution is precipitated and the system is converted to a slurry; (2) passing the slurry formed in said first crystallization vessel to a second crystallization vessel maintained at a temperature and pressure lower than the temperature and pressure of said first crystallization vessel, the temperature and pressure in said second crystallization vessel causing further precipitation of the terephthalic acid dissolved in said solvent by the adiabatic evaporation of 10–60% by weight of said solvent in said slurry formed in said first crystallization vessel; (3) optionally passing the slurry from said second crystallization vessel to one or more subsequent crystallization ves- sels maintained in series, each subsequent crystallization vessel being at a temperature and pressure lower than the immediately preceding crystallization vessel so as to cause precipitation of an increasingly greater amount of the terephthalic acid in the slurry in each succeeding subsequent crystallization vessel by the adiabatic evaporation of 10–60% by weight of said solvent in the slurry in each subsequent crystallization vessel; said heated solution and slurry from each crystallization vessel being fed into the residual previously formed slurry in said first, second and subsequent crystallization vessels, the terephthalic acid concentration in each crystallization vessel being controlled so as to be no greater than 60 parts by weight of solid terephthalic acid per 100 parts by weight of said solvent; (4) withdrawing the terephthalic acid slurry from the last crystallization vessel; and (5) recovering the terephthalic acid from said slurry withdrawn from said last crystallization vessel.

2. The process of claim 1 wherein the quantity of said solvent adiabatically evaporated in each crystallization vessel is 30–60% by weight based on weight of the solution or slurry introduced into the crystallization vessel.

3. The process of claim 1 wherein the terephthalic acid concentration is controlled in each crystallization vessel by adding additional solvent to said crystallization vessels in an amount corresponding to at least 70% by weight of said solvent adiabatically evaporated from the crystallization vessel.

4. The process of claim 3 wherein the addition of solvent is effected by condensing the adiabatically evaporated solvent from each of the crystallization vessels, and recycling the condensed solvent.

5. The process of claim 4 wherein substantially all of the solvent adiabatically evaporated from each crystallization vessel is condensed and recycled to the corresponding crystallization vessel.

6. The process of claim 1 wherein the water content of said solvent is within the range of 3–15% by weight.

7. The process of claim 1 wherein said solvent is acetic acid.

8. The process of claim 7 wherein the temperature of the heated solution is within the range of 260–310° C.

9. The process of claim 1 wherein the number of crystallization vessels in series is 3–8.

References Cited

UNITED STATES PATENTS 3,364,256    1/1968    Ichikawa et al.    260—525
3,452,088    6/1969    Olsen et al.    260—525

OTHER REFERENCES

Skan et al., "Determination of Melting and Freezing Temperatures" in Physical Methods of Organic Chemistry, Weissberger, ed., 3rd edition, 1959, pp. 349–51.

LORRAINE A. WEINBERGER, Primary Examiner

R. S. WEISSBERG, Assistant Examiner